Figure 1:
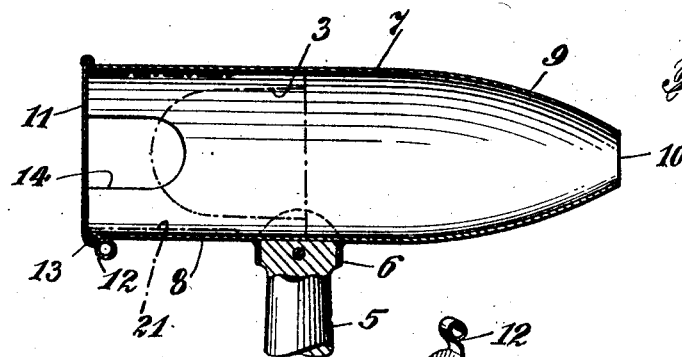

April 7, 1925.

D. L. STRUMPF

CONFECTION SCOOP

Filed July 21, 1922

1,532,275

Inventor
David L. Strumpf
By Dean, Fairbanks, Obright & Hirsch
his Attorneys

Patented Apr. 7, 1925.

1,532,275

UNITED STATES PATENT OFFICE.

DAVID L. STRUMPF, OF NEW YORK, N. Y.

CONFECTION SCOOP.

Application filed July 21, 1922. Serial No. 576,522.

*To all whom it may concern:*

Be it known that I, DAVID L. STRUMPF, a citizen of the United States, and resident of New York city, in the county of New York and State of New York, have invented certain new and useful Improvements in Confection Scoops, of which the following is a specification.

My present invention relates to frozen confectionery put up in a form intended for consumption without the use of a spoon or other implement, and to apparatus for preparing the same.

It is an object of the invention to provide a confection of the type set forth, in a form adapting it to be eaten in comfort without need for dexterity or haste to prevent loss of frozen constituent, and without soiling the face or the hands.

Another object is to provide an article of confection of the above type attractive in appearance which may be rested without auxiliary prop or frame upon a table.

Another object is to provide a scoop of simple and inexpensive construction, by the use of which the preferred article of confection can be speedily prepared without the exercise of skill.

In a preferred embodiment of the invention, the confection comprises a grip, holder or handle member of hard material, not subject to rapid softening, distortion or disintegration by the heat of the air or by moderate handling, into which is firmly packed a lump of ice cream or other frozen confection, the main body of which projects beyond said grip or holder member and has a contour preferably continuous with the contour of the grip member and is shaped to an elongated tapering or generally conical form for ready insertion of its tip into the mouth.

Preferably, the general contour of the confection is that of a bullet or shell, the handle or base member constituting a cylindrical cartridge of edible material such as chocolate having a socket in the upper end thereof, which is packed with the ice cream lump, the major portion of which projects in the general shape of a cone above the edge or rim of the chocolate cartridge. This construction provides a compact, attractive confection which may be rested upright on a table with the ice cream lump out of contact therewith, the base forming a convenient grip or holder, the ice cream projection being shaped for ready insertion of its end into the mouth without soiling the face, the rim of the chocolate grip or holder together with the socket constituting a firm anchor, preventing danger of cocking or tipping the ice cream lump out of the base and losing it in handling or eating. In the preferred embodiment, the cylindrical chocolate base is formed with longitudinal grooves below its rim, which form convenient ducts or passages for flow of any ice cream that may melt while the confection is being eaten, without contacting or soiling the fingers.

Another feature of the invention is the provision of a scoop element by which the preferred form of confection unit may be readily prepared or put up. This scoop preferably comprises a retainer for the chocolate cartridge and a mold element rigid therewith having the form of the projecting portion of ice cream and having an entry opening through which the ice cream can be scooped up and forced into the chocolate holder and against the wall of the mold. In the preferred embodiment, the scoop comprises a simple integral shell having a cylindrical element for the chocolate cartridge, the conical mold element being integral, continuous and coaxial therewith and open at its smaller end for scooping in the ice cream. The chocolate holder is inserted through the open end of the cylinder portion and removed therethrough together with the lump of ice cream molded thereinto, a hinged cover at said open end retaining the chocolate holder against displacement during the scooping operation.

Figure 3:
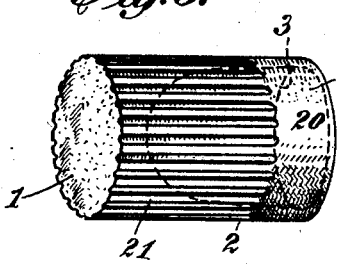
Figure 2:
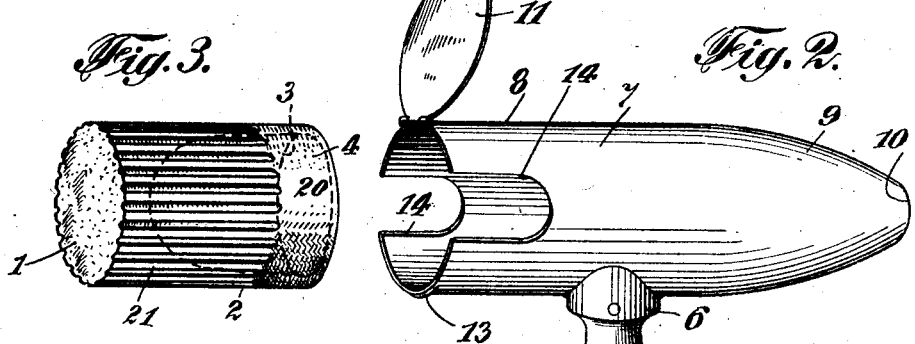
Figure 4:
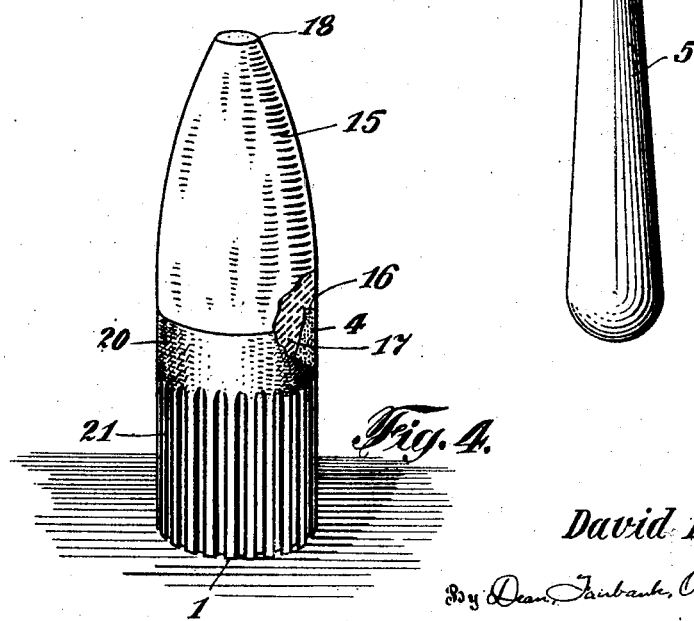

In the accompanying drawings in which is shown one of various possible embodiments of the several features of this invention, Fig. 1 is a view in longitudinal cross-section of a preferred form of scoop, the handle being shown partly broken away, Fig. 2 is a perspective view of the scoop showing the cover in open position, Fig. 3 is a perspective view of the chocolate cartridge or base, aligned with the scoop shown in Fig. 2, preparatory to insertion therein, and;

Fig. 4 is a perspective view of the completed confection unit partly in section resting upon its base.

Similar reference characters refer to similar parts throughout the several views of the drawings.

Referring now to the drawings, I have shown a confection comprising a generally cylindrical cartridge (Fig. 3) which may be of hard chocolate and has a closed or base end 1, a generally cylindrical wall element 2 and a deep socket or cavity 3 at its opposite end with a rim 4 of substantial width. Preferably, the exterior surface of the cartridge is provided with uniformly distributed longitudinal grooves or flutings 21 extending from below a smooth ring 20 at its socket end down to the closed end or bottom 1, for a purpose which will appear hereinafter.

The preferred form of scoop includes a handle 5 of wood having a metallic ferrule 6 at its end to which is secured by soldering, welding or equivalent operation or means, the scooping shell 7 with its axis preferably at right angles to that of the handle. The scooping shell comprises an integral element which may be made of suitable metal comprising a cylindrical portion 8 of length greater than that of the chocolate cartridge and interior diameter equal to the exterior diameter of band 20 on said chocolate cartridge, having continuous, integral and coaxial therewith a tapering, generally conical molding portion 9 open at its smaller end 10. The open end of the cylindrical shell portion 8 has hinged thereto a cover 11 provided with a snap fastener tongue 12 coacting with a corresponding rib 13 pressed out of shell 8.

It being understood that the confectioner has in stock a supply of the chocolate cartridges shown in Fig. 3, he will prepare the confection, preferably as the customer orders it, by inserting a chocolate cartridge through the larger end of the scoop element with the socket 3 in advance, as best indicated in Figs. 2 and 3, thereupon snapping the cover 11 closed. He then grasps the handle 5, preferably wetting the molding end of the scoop to prevent sticking of ice cream thereto, and digs or scoops the apertured smaller end 10 thereof into the can of ice cream until the shell is filled. The ice cream or other plastic confection is thereby forced against the cartridge, thereby pressing the latter toward cover 11 and the ice cream packs tightly into the socket 4 and against the wall of the molding element 9 of the shell, but none will pass the chocolate ring 20, which is snugly embraced by shell 8. Thereupon the cover 11 is opened and the cartridge is gripped through finger holes as at 14 in the adjoining end of the shell, with the molded ice cream filler 15 united therewith. Thus, the chocolate grip is inserted in the larger end of the scoop, the ice cream is admitted through the smaller end, and by reason of the cylindrical and tapering conformation of the completed confection, it is readily withdrawn as a unit through the larger end of the scoop, without need for forming a displaceable scooping end, in general, required where the ice cream holder or grip has walls diverging toward the ice cream lump. The tapering molded end of ice cream of my confection is cylindrical at its base end, its contour merging with that of the chocolate base, and tapers in the form of the projectile of a shell or bullet, the chocolate base simulating the cartridge element.

The flange 16 formed, as will be apparent, in molding the ice cream lump against the rim 4 of the chocolate cartridge and the plug portion 17 of the lump 15 packed or molded into the elongated socket 3 within said cartridge will effect firm anchoring and cohesion between the chocolate and ice cream elements, so that any impulse applied near the point 18 of the projecting ice cream portion, by the tongue, teeth or lips, will not be adequate to cock the lump or to eject it from the chocolate holder.

The elongated tapering generally conical projecting end of ice cream is of convenient shape for insertion of its tip into the mouth, presenting a form, somewhat similar to that of a spoon, filled with ice cream and the great bulk of the frozen constitutent may be eaten before the lips or teeth touch the chocolate grip. The confection may, therefore, be eaten with comfort and convenience and no haste is needed in eating to avoid loss of ice cream and the face will not become soiled with melted cream. In types of confection in which the ice cream is completely encased in a hard chocolate coating, the latter may crack freely upon application of the teeth thereto, and it is difficult to avoid soiling the hands and face and losing part of the ice cream, even if the confection is rapidly stuffed into the mouth and this is particularly true if the ice cream is soft. The semispherical lump of ice cream employed in the familiar ice cream cone, also must be attacked with some care to avoid ejecting it from the rim of the cone and to avoid smearing ice cream over the lips, nose or chin. Moreover, the lump is pressed by the lips in eating into the empty space within the cone, so that access to the ice cream is difficult and inconvenient particularly, as is frequently the case, if the consumer finds the pastry element unpalatable.

My confection, moreover, can be rested stably upon its base on a table or counter with the ice cream lump projecting upward therefrom, free from contact therewith, and unlike the ice cream cone, need not be held in the hand or in a special frame from the time it is made up until it has been eaten.

The contour of the projecting ice cream lump being continuous, with that of the chocolate cartridge, any portion of the frozen filler melting before the confection has been completely consumed, will flow down the wall of the chocolate cartridge in and along the grooves 21 free from contact with the fingers by which the cartridge is grasped for eating. By reason of the intimate contact of the ice cream with the chocolate cartridge, the latter will keep cool and will not soften in warm weather, even if the confection is not eaten immediately after it is prepared.

It will be seen that the confection provides a particularly attractive appearance, simulating the form of a bullet or shell, the longitudinal ducts, moreover, adding to its ornamental appearance. Because of its attractiveness and compactness and the facility with which it may be eaten without a spoon and without mess, my confection when prepared of high quality ingredients will be sought not only by children but also by discriminating adults.

The scoop it will be seen is particularly simple, durable and inexpensive and the operation of molding the ice cream lump into the cartridge and removing the confection from the scoop is simple and expeditiously executed.

Of course, the proportions or dimensions of the confection may be varied widely and the edible base, holder or grip may be made of confections other than chocolate, such as hard candy or pastry, or of non-edible material, and plastic confections or edibles other than ice cream may be used as fillers, but the preferred embodiment is the specific confection and scoop shown and described.

It will thus be seen that there is herein described apparatus in which the several features of this invention are embodied, and which apparatus in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown on the accompanying drawings shall be interpreted as illustrative and not in a limiting sense.

If desired, the base end of the chocolate cartridge may be protected by a removable covering which, if desired, may be of metal foil to more closely simulate the appearance of a covering.

Having thus described my invention, what I claim as new and desire to secure by Letters-Patent of the United States is:—

1. A scoop including means for housing a removable base or holder for frozen confection, said scoop including a shaping or molding element beyond the handle housing portion, having an opening for admission of frozen confection to mold a lump of predetermined form projecting beyond the handle or holder and filling the same.

2. A scoop for preparing a frozen confection of the type comprising a rigid handle or holder and a frozen confection member filling the same and projecting therebeyond, said scoop comprising retaining means for the holder and molding or forming means beyond said retaining means having an opening through which frozen confection is forced in the scooping operation to form a molded lump of predetermined shape filling said holder and projecting therebeyond.

3. A scoop for preparing an ice cream confection, said scoop comprising a shell having a larger end for insertion of a removable ice cream lump holder, a smaller molding end through which ice cream is scooped, forced into said holder and molded against the wall of said molding end, said scoop having a closure for preventing longitudinal shifting of said holder in the molding operation, said holder with the frozen lump molded thereinto being removable through the larger end of said scoop upon opening of said closure.

4. A scoop for ice cream confection including a cylindrical shell portion having continuous therewith a tapering, molding portion extending therebeyond and terminating at an open end, and movable closure means at the open end of the cylindrical portion.

5. A scoop comprising a handle and a cylindrical shell member having its axis substantially at right angles thereto, said cylindrical member having continuous therewith a tapering, generally conical projection coaxial therewith and open at its smaller end, and a cover at the open end of the cylindrical portion.

6. A scoop comprising a handle and an integral shell member rigid therewith having a cylindrical portion and a generally conical tapering portion continuous therewith, said shell being open at both ends and a cover for the larger end of said shell, whereby upon insertion of a cylindrical confection holder through the larger end of the scoop and closing of the cover, the operation of scooping the smaller open end into a mass of frozen confection will result in compressing a mass thereof into the open end of the cylindrical holder and in filling the generally conical end of the scoop, and whereby upon opening the cover, the handle member may be withdrawn as an integral part with the molded lump of frozen confection connected thereto.

7. The combination set forth in claim 6 in which a pair of diametrically opposite slots are provided adjacent the cover end through which the holder member may be grasped in removal.

Signed at New York in the county of New York and State of New York this 20th day of July, 1922.

DAVID L. STRUMPF